(12) United States Patent
Liu et al.

(10) Patent No.: US 7,792,924 B2
(45) Date of Patent: Sep. 7, 2010

(54) USING A MOBILE PHONE TO REMOTELY CONTROL A COMPUTER VIA AN OVERLAY NETWORK

(75) Inventors: Yunxin Liu, Redmond, WA (US); Junfeng Zhou, Redmond, WA (US); Qian Zhang, Kowloon (HK)

(73) Assignee: Microsoft Corporation, Redmond, WA (US)

( * ) Notice: Subject to any disclaimer, the term of this patent is extended or adjusted under 35 U.S.C. 154(b) by 717 days.

(21) Appl. No.: 11/290,797

(22) Filed: Nov. 30, 2005

(65) Prior Publication Data

US 2007/0124406 A1 May 31, 2007

(51) Int. Cl.
*G06F 15/16* (2006.01)
(52) U.S. Cl. .................. 709/218; 709/206; 709/207
(58) Field of Classification Search ............... 709/206, 709/207, 218
See application file for complete search history.

(56) References Cited

U.S. PATENT DOCUMENTS

| | | | |
|---|---|---|---|
| 5,710,922 A | 1/1998 | Alley et al. | |
| 5,845,282 A | 12/1998 | Alley et al. | |
| 5,953,399 A | 9/1999 | Farris et al. | |
| 7,269,629 B2 * | 9/2007 | Zmudzinski et al. | 709/207 |
| 2002/0141549 A1 | 10/2002 | Swanson et al. | |
| 2004/0189695 A1 | 9/2004 | Kurtz et al. | |
| 2005/0021539 A1 | 1/2005 | Short et al. | |
| 2005/0039133 A1 | 2/2005 | Wells et al. | |
| 2005/0061336 A1 | 3/2005 | Goetz et al. | |
| 2005/0149481 A1 * | 7/2005 | Hesselink et al. | 707/1 |
| 2005/0198534 A1 | 9/2005 | Matta et al. | |
| 2005/0261031 A1 | 11/2005 | Seo et al. | |
| 2005/0261970 A1 | 11/2005 | Vucina et al. | |
| 2006/0188096 A1 * | 8/2006 | Aguilar | 380/200 |
| 2006/0223527 A1 | 10/2006 | Lee et al. | |
| 2006/0248557 A1 * | 11/2006 | Stark et al. | 725/37 |

OTHER PUBLICATIONS

Ubiquitous Viewer recreates PC or notebook desktop on mobile phone's screen, by Paul Kallender, IDG News Service, Jan. 18, 2005; http://www.infoworld.com/archives/emailPrint.jsp.*

* cited by examiner

*Primary Examiner*—Yves Dalencourt
(74) *Attorney, Agent, or Firm*—Lee & Hayes, PLLC

(57) ABSTRACT

Systems and methods are described for using a mobile phone to remotely control a computing device. In one implementation, a communication channel between the mobile phone and the computing device uses an overlay network, such as an instant messaging (IM) service, to exchange communication data packets. An exemplary system includes a flexible layered architecture—which allows tailoring the system for remote control of various applications using various network configurations. Based on the overlay protocol used, a transport protocol layer can provide helpful application programming interfaces (APIs). On top of the transport protocol layer, a remote control protocol defines a framework for packet exchange of extensible commands, customizable for remote control of diverse applications. Use of paired-key encryption, IM accounts, and buddy lists ensure that communications between mobile phone and remote computer are secure.

20 Claims, 7 Drawing Sheets

USING A MOBILE PHONE TO REMOTELY CONTROL A COMPUTER VIA AN OVERLAY NETWORK

BACKGROUND

Mobile phones play an increasingly significant role in people's daily lives. Mobile phones have become smart devices, which users always keep near at hand regardless of where they are. Mobile phones have also become much more compact, and easier to carry at all times. Further, a mobile phone provides a unique telephone number, that can be used as an authenticator to identify each individual owner. Mobile phones have also gained increasing capacity in terms of processing power, screen resolution, rich applications, and connectivity. With global GPRS and CDMA1x networks, mobile phones can provide Internet access that is always on, regardless of the user's location. Thus, mobile phones have become numerous, easy to carry, powerful, reliable, and packed with features.

Likewise, more people now possess a personal computing device, such as a desktop computer in the home or office, than ever before. Computers continue to increase in power and rich features in the same manner that mobile phones have. What is needed is a way for mobile phones to interact with computers more fluently in order to become portable central access points for data exchange and remote control of home or office computers, especially when the human owners are away from their computers or traveling on the road.

SUMMARY

Systems and methods are described for using a mobile phone to remotely control a computing device. In one implementation, a communication channel between the mobile phone and the computing device uses an overlay network, such as an instant messaging (IM) service, to exchange communication data packets. An exemplary system includes a flexible layered architecture—which allows tailoring the system for remote control of various applications using various network configurations. Based on the overlay network used, a transport protocol layer can provide helpful application programming interfaces (APIs). On top of the transport protocol layer, a remote control protocol defines a framework for packet exchange of extensible commands, customizable for remote control of diverse applications. Use of paired-key encryption, IM accounts, and buddy lists ensure that communications between mobile phone and remote computer are secure.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Overview

This disclosure describes how to use a mobile phone as a controller and data exchange center for a remote computer using an overlay network. Such a mobile phone can be used to remotely control a home or office computer at long distances, even around the globe. In one implementation, to make a communication connection between the mobile phone and the remote computer, an instant messaging (IM) service overlay, such as the MICROSOFT MSN MESSENGER® Service, YAHOO IM, or AOL IM is used as one part of the communication channel that links the mobile phone and the remote computer.

Generally, mobile phones cannot communicate with a personal computer directly, or even indirectly. The two technologies—mobile phones and computers—have evolved somewhat separately, using different protocols for communication-at-a-distance, communication protocols that are either somewhat alien to each other or blocked by boundaries such as network devices that use network address translation (NAT) tables or firewalls.

One recent common denominator for both mobile phones and computers is an ability to access the Internet, although each technology gains access to the Internet in a different manner. This common ability to access the Internet usually brings to mind the exchange of email, and/or text messages between mobile phone and remote computer. Exemplary systems and methods described herein, however, adopt an overlay network, such as an instant messaging service, to provide a channel through which a mobile phone and a computer can become much more fluent in exchanging commands and data packets. This allows a mobile phone user to control a remote computer much as if the user were operating the computer itself. Some overlay networks, such as those constituting instant messaging services, happen to have many features that are ideal for linking a mobile phone more intimately to a remote computer.

Example scenarios are now described. Many mobile phones are presently able to access e-mail. Using the exemplary systems and methods described herein, a hypothetical user, Tom, is traveling and receives an e-mail from one of his colleagues asking for a document which is on Tom's office computer. Tom uses his mobile phone to connect to his office computer, and by controlling his computer with the mobile phone, Tom can attach the document from the computer's hard drive to an email message being composed on the computer, and then send an email from the computer to the colleague with the requested document as an attachment.

Likewise, hypothetical user Helen is at a party at her friend's home. She wants to share some photos with her friends but the photos are at home, on her computer there. Helen uses her mobile phone to connect to her home computer, and by remotely controlling her home computer with the mobile phone, she has the home computer send the photos to her friend's computer.

Exemplary Systems

Figure 1:
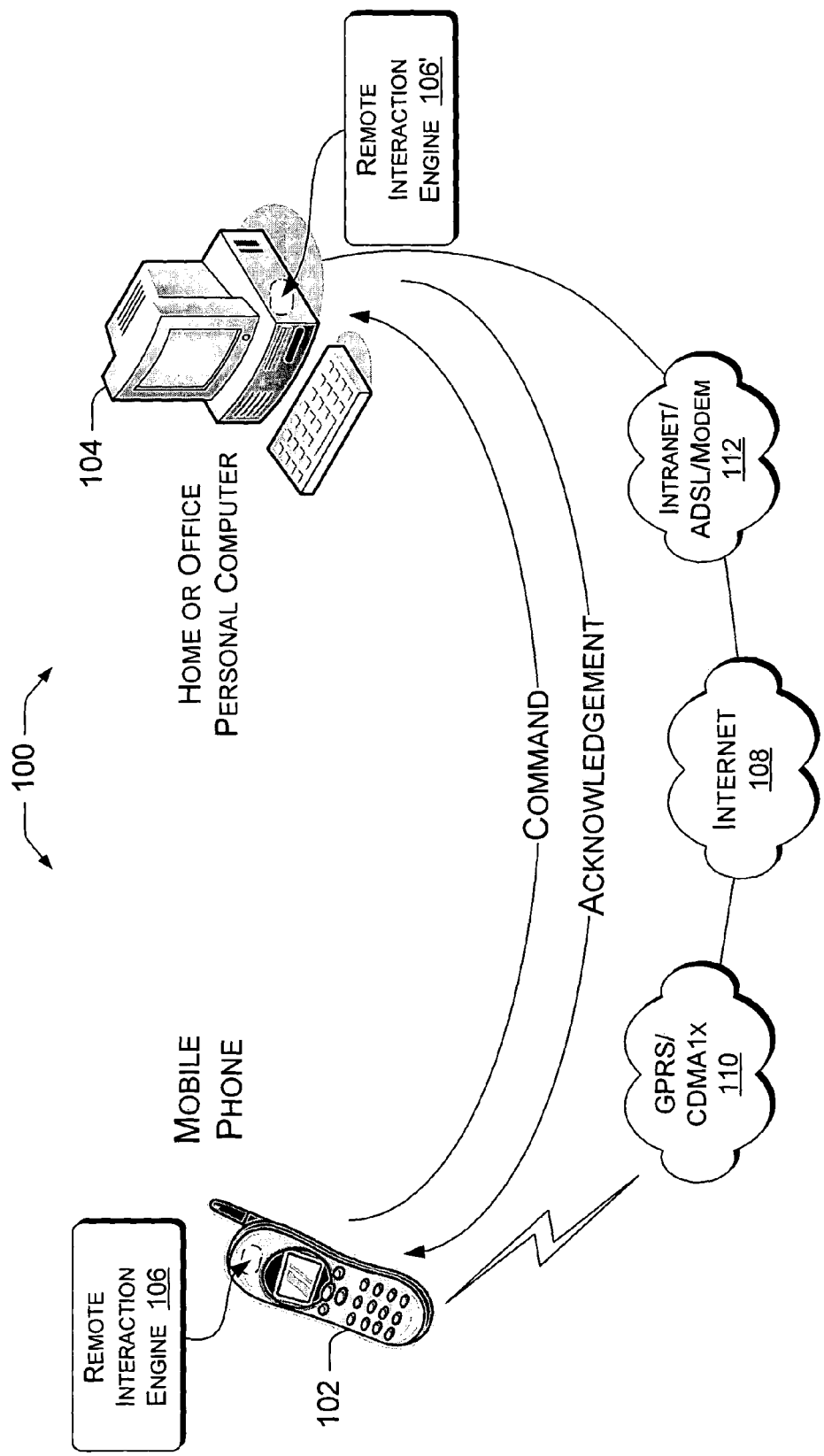
FIG. 1 is a diagram of an exemplary system for using a mobile phone to remotely control a computing device.

FIG. 1 shows an exemplary system 100 that enables basic communication between a mobile phone 102 and a computer 104. The mobile phone 102 and the computer 104 each have exemplary remote interaction engines 106 and 106' that take advantage of the common ability of the mobile phone 102 and the computer 104 to access the Internet 108. The mobile phone 102 may access the Internet 108 via general packet radio service (GPRS) or via code division multiple access (CDMA) 1x networks 110, etc.; while the computer 104 accesses the Internet 108 via a corporate Intranet (for an office computing device), for example, or via a asymmetric digital subscriber line (ADSL)/modem link 112 (i.e., for home personal computer). After establishing a physical communication link between the mobile phone 102 and the computer 104, the mobile phone 102 will be able to remotely control the computer 104 by sending control commands to the computer 104 using the set-up to be shown in FIG. 2. The computer 104 will also be able to send acknowledgements back to the mobile phone 102 through the illustrated general connection route.

Figure 2:
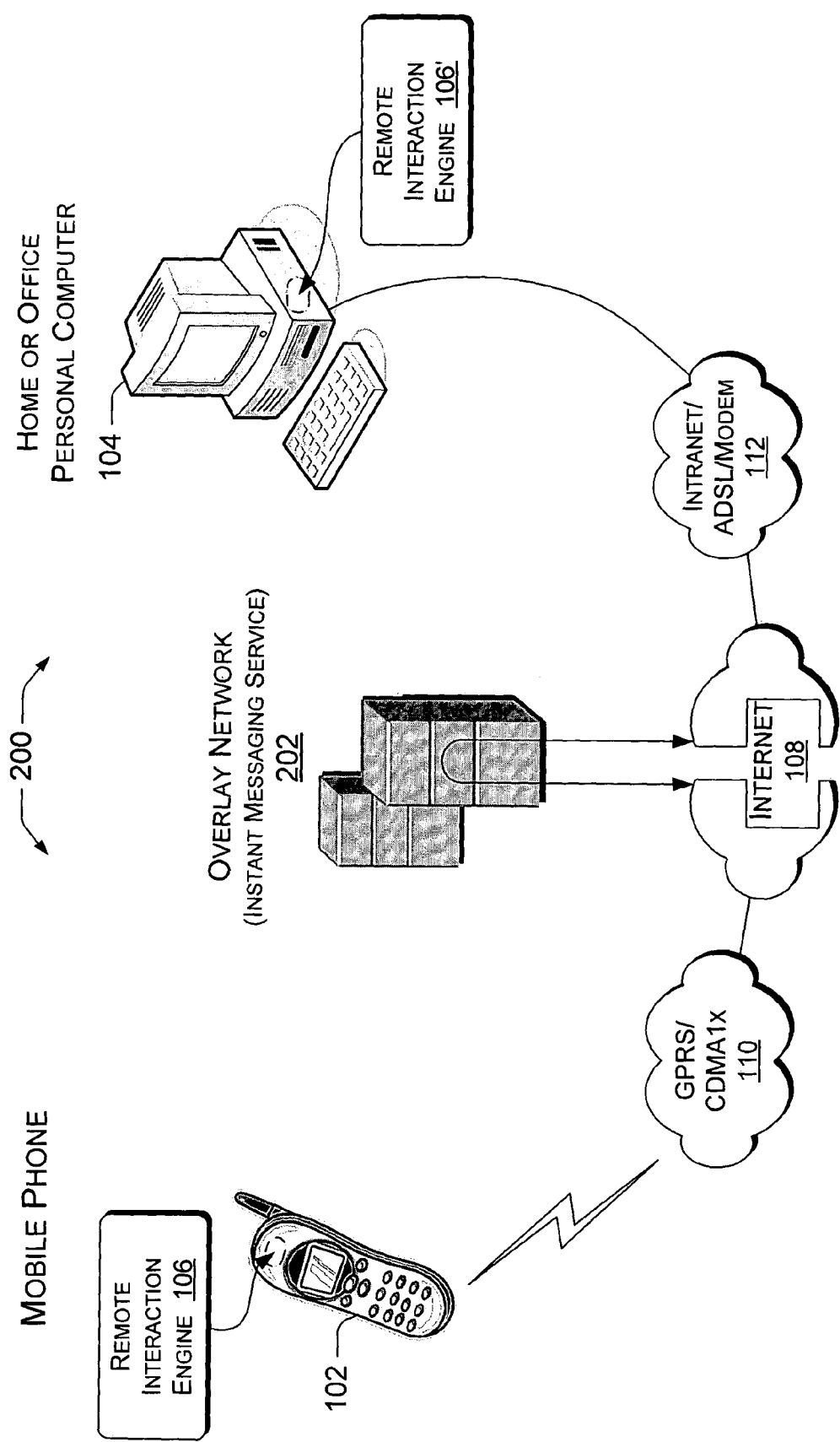
FIG. 2 is a diagram of an exemplary system for using a mobile phone to remotely control a computing device via an overlay network, such as an instant messaging (IM) service.

FIG. 2 shows an exemplary communication system 200 in which an overlay network 202, such as an instant messaging (IM) service, is adopted as a communication channel for exchanging commands and acknowledgements between the mobile phone 102 and the computer 104. Many overlay networks can create a structured virtual topology above the basic transport protocol level. This is fortunate, because in conventional practice, it is not straightforward to make a viable communication connection between a mobile phone 102 and a home or office computer 104 that can carry command data from applications. Although these devices have access to the Internet 108, their networks (GPRS or CDMA 1x 110; corporate Intranet or ISP networks via ADSL/Modem 112) generally apply Network Address Translation (NAT), firewall, or proxy technologies. These technologies protect the "inside" devices but also limit their connectivity to other devices on the Internet 108. If both the mobile phone 102 and the computer 104 are behind a device utilizing NAT, it is not practical for them to establish a direct connection with each other. In addition, both mobile phones 102 and home or office computers 104 generally do not have a public Domain Name System (DNS) name. They do not even have a static Internet Protocol (IP) address. Instead, their IP addresses are dynamically allocated by their Dynamic Host Configuration Protocol (DHCP) servers. Not having a public DNS name or a static IP address makes it hard to identify a mobile phone 102 and a home or office computer 104 for purposes of making a connection.

In one implementation, an instant messaging (IM) service is used as the overlay network 202 to provide a communication channel. Instead of establishing a direct connection between the mobile phone 102 and the computer 104, the system 200 uses the overlay network 202, e.g., IM service, as the communication channel—i.e., the servers of the IM service are used as bridges. The mobile phone 102 and the computer 104 send their commands or acknowledgements to an IM service and the IM service relays these commands and acknowledgements to the other device. Moreover, other overlay networks 202 can be used instead of an instant messaging service.

In one implementation, to solve the naming problem, the system 200 applies an IM account for each mobile phone 102 or computer 104 and uses the account as the unique identity of each device. In one implementation, for security considerations, an explicit "buddy" establishing procedure is used before a mobile phone 102 is able to control a computer 104. A computer 104 may be controlled by only the mobile phones 102 that are in its buddy list.

Figure 3:
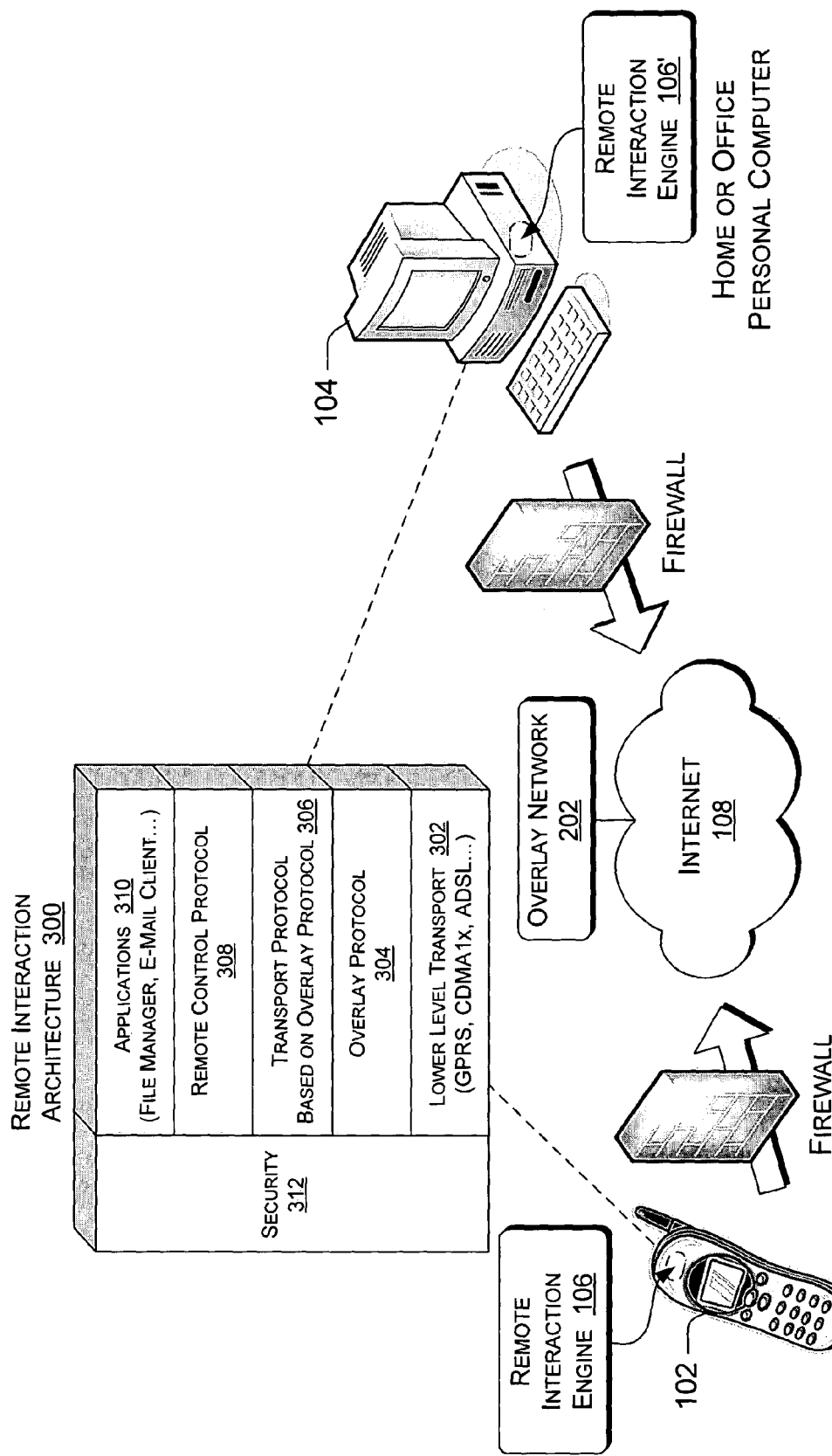
FIG. 3 is a diagram of exemplary remote interaction architecture.

FIG. 3 shows an exemplary architecture 300 of the communication system 200 of FIG. 2. In one implementation, the mobile phone 102 acts as a remote control client, and the computer 104 acts as a remote control server. Accordingly, this implementation includes a client-side remote interaction engine 106, which resides in the mobile phone 102, and a server-side remote interaction engine 106', which resides in the computer 104.

In one implementation, the following hardware and software platforms are used to build a system 200 conforming to the exemplary architecture 300. An Advanced RISC Machine (ARM)-based SMARTPHONE, made by HTC, can be used for the mobile phone 102 (HTC Corporation, Taoyuan, Taiwan, R.O.C). This mobile phone 102 can run, e.g., MICROSOFT WINDOWS MOBILE® 2003 for SMARTPHONE and has a GPRS connection. The computer 104 can be an x86-based personal computer, running MICROSOFT WINDOWS® XP and may have an ADSL or intranet connection. Both the client-side remote integration engine 106 and the server-side remote integration engine 106' share a similar software structure, corresponding to layers of the exemplary architecture 300.

First, a lower level physical transport layer 302 ensures that both the mobile phone 102 and the computer 104 can access the Internet 108. The underlying network can be GPRS, CDMA1x, etc., for the mobile phone 102; and ADSL, Ethernet, etc., for the home or office computer 104. A TCP/IP stack can be used on these networks. This lower layer 302 is typically implemented by the Operation System (OS), so in one implementation, a well-defined Application Programming Interface (API) can be called to establish a connection.

The next layer on top of the physical transport lower layer 302 is an overlay protocol layer 304. This layer provides a communication channel between the mobile phone 102 and the computer 104, as well as a naming system to identify each communication peer. As mentioned, it is difficult or impossible to establish a direct connection between the mobile phone 102 and the computer 104 due to various network boundary entities such as NAT, firewall, and proxy. Therefore, on overlay network, such as the IM service, is used as the bridge.

The third layer, which is built on the layer below, is a full-fledged transport protocol layer 306, based on the overlay protocol layer 304. The transport protocol layer 306 encapsulates the overly protocol, such as in IM protocol, as a reliable and stream-oriented data channel, and provides a suite of Winsock-like application programming interfaces (APIs) to the upper layers of the architecture 300.

On top of the transport protocol layer 306, a fourth, remote control protocol layer 308, includes a series of control commands to be used between the client-side remote interaction engine 106 and the server-side remote interaction engine 106'. These commands define the extent and capability of the remote control achieved by the mobile phone 102.

An applications layer 310 is the fifth and "top" layer of the exemplary remote interaction architecture 300. The applications layer 310 includes a variable number of user-friendly applications that are based on top of the remote control protocol layer 308, such as a file manager, an email client, etc. Each application uses a set of application-specific control commands to achieve its functionality, and can have a user-friendly user interface designed especially for the display screen of a mobile phone 102.

A security "layer" 312, runs across the other layers and includes multiple mechanisms to ensure that the control procedures are performed in a secure manner. Thus, the security layer 312 is not necessarily a discrete layer, but may be embedded into the other layers.

Exemplary Engine

Figure 4:
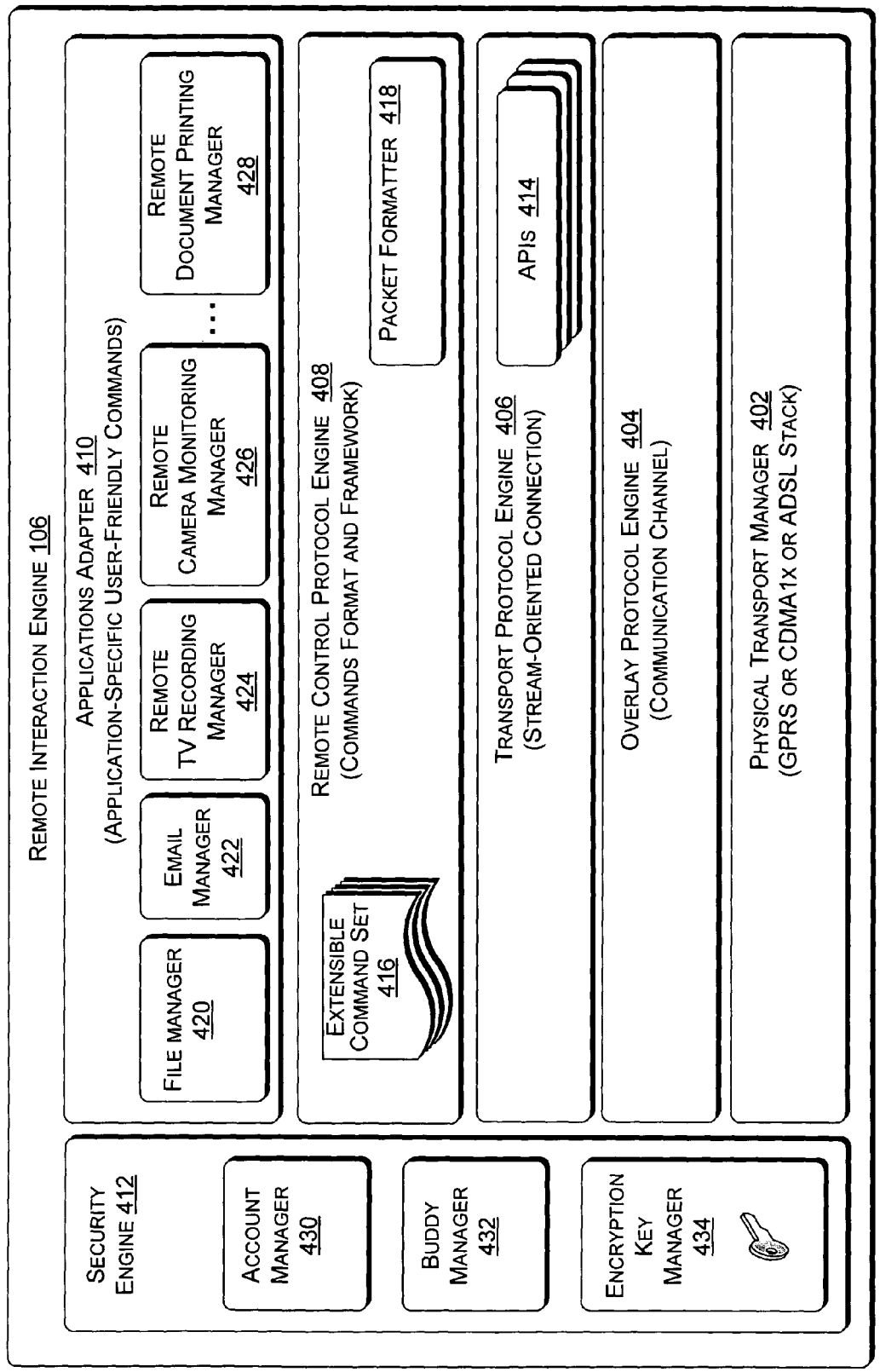
FIG. 4 is a block diagram of an exemplary remote interaction engine.

FIG. 4 shows the exemplary remote interaction engine 106 of FIGS. 1-3 in greater detail. The illustrated configuration of the remote interaction engine 106 is meant to provide only one example arrangement for the sake of overview. Other arrangements of the illustrated components, or similar components, are possible within the scope of the subject matter. Such an exemplary remote interaction engine 106 can be executed in combinations of hardware, software, firmware, etc.

The exemplary remote interaction engine 106 includes a physical transport manager 402, an overlay protocol engine 404, a transport protocol engine 406, a remote control protocol engine 408, an applications adapter 410, and a security engine 412. The transport protocol engine 406 may further expose stream-oriented application programming interfaces (APIs) 414. The remote control protocol engine 408 further includes an extensible command set 416 and a packet formatter 418. The applications in the applications adapter 410 may include a file manager 420, an email manager 422, a remote television recording manager 424, a remote camera monitoring manager 426, and a remote document printing manager 428, among others. Finally, the security engine 412 may further include an account manager 430, a buddy manager 432, and an encryption key manager 434.

The physical transport manager 402 typically uses a GPRS or CDMA1x stack, in the case of the client-side remote interaction engine 106 in the mobile phone 102, or an ADSL stack or intranet link in the case of a server-side remote interaction engine 106'.

In one implementation, the overlay protocol engine 404 and the security engine 412 may set-up a communication channel between the mobile phone 102 and the computer 104 in the following manner. In an IM implementation of the overlay network, the account manager 430 of the security engine 412 may create two accounts, such as separate passports, for the remote control client and server (phone 102 and computer 104, respectively) and then the buddy manager 432 may set these accounts up as buddies of each other.

The computer 104 may start its remote interaction engine 106' at system startup, and then wait in an ongoing manner for new control session to be initiated by a mobile phone 102 on its buddy list. In one implementation, the user of the mobile phone 102 starts the client-side remote interaction engine 106, e.g., by selecting such an option from the phone's menu. The physical transport manager 402 of the mobile phone 102 establishes, for example, a GPRS session using a WINDOWS MOBILE® Connection Manager API. The overlay protocol engine 404 connects, in an IM implementation, to an overlay network 202 that is an IM service, authenticates itself, and sets its presence status using the IM protocol in use, e.g., MSN® MESSENGER® Service protocol.

The overlay protocol engine 404 of the mobile phone 102 opens a chat session to the remote control server—that is, to the computer 104, and the encryption key manager 434 of the mobile phone 102 and the computer 104 may negotiate security parameters with each other. Thereafter, all commands and responses are ideally encrypted using a session key. The mobile phone 102, as client, queries the capability of the computer 104, as remote control server, and allows the user to decide which application is to be currently launched for remote control. For example, if the application selected is the file manager 420, then the mobile phone 102 pops up the file manager user interface on the display of the mobile phone 102, and allows the user to browse and manage the files in the home or office computer 104.

The transport protocol engine 406 is based on the overly protocol, such as an IM protocol, in use (i.e., uses the communication channel mediated by the overlay protocol engine 404) and implements a fully-fledged transport layer protocol. The transport protocol engine 406 encapsulates the overlay protocol that is in use as the underlying communication channel and provides a reliable and stream-oriented connection for the upper layer components (i.e., the remote control protocol engine 408 and the applications adapter 410). In one implementation, the transport protocol engine 406 supports a suite of APIs similar to WINSOCK (WINDOWS® Socket) so that applications are able to use the transport protocol to transmit their data using the Winsock programming style. The accounts initiated by the account manager 430 of each device are used to identify the communication end-points. For example, active IM accounts may be logged onto before communication.

The remote control protocol engine 408, using the transport protocol engine 406 described above, implements a control protocol that defines how the mobile phone 102 and computer 104 communicate with each other. In one implementation, the control protocol is text-based and consists of a set of extensible commands 416. These commands are transmitted, in turn, by the transport protocol, which is based, in turn, on the overlay protocol in use.

Figure 5:
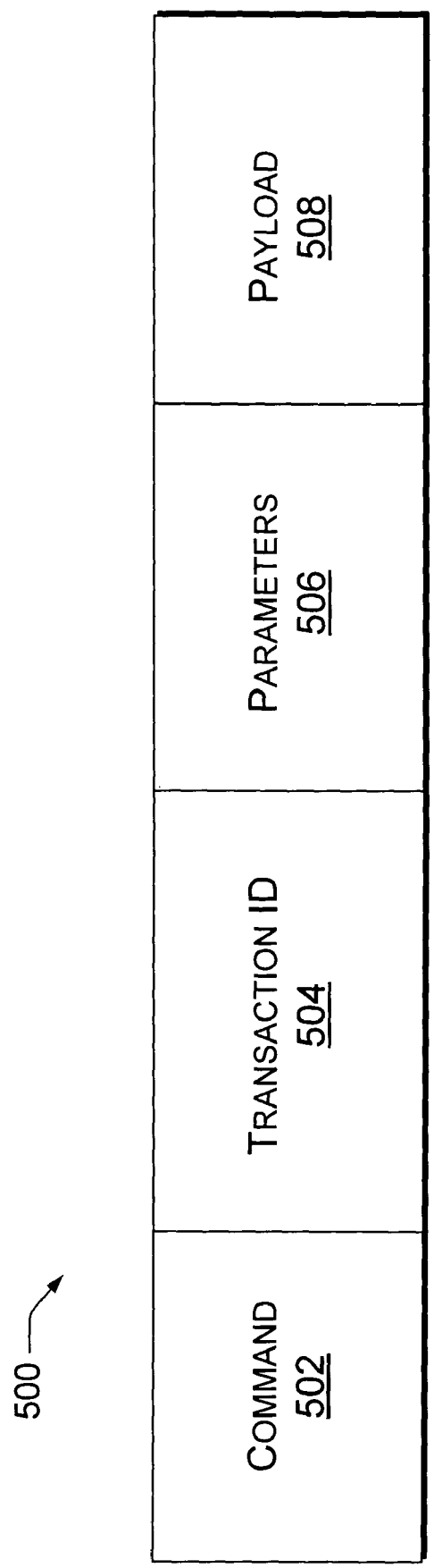
FIG. 5 is a diagram of an exemplary data packet structure for sending data for remote control of a computer using a mobile phone and an overlay network, such as an IM service.

As shown in FIG. 5, the remote control protocol engine 408 uses a packet format 500, by which the packet formatter 418 packetizes the command and response data to be exchanged between mobile phone 102 and computer 104. The "command" field 502 holds the name of a particular command defined for or by an application. The "transaction ID" field 504 is used to identify and match the commands and their responses (acknowledgements). In this manner, the transaction ID field 504 remains identical among the request(s) and response(s) in a transaction. The mobile phone 102 may send out several commands at one time, and then wait for the responses or acknowledgements. By checking the transaction ID fields 504, the mobile phone 102 matches the responses received to each corresponding original command. The "parameters" field 506 holds parameters for a command. This field is optional because a command 502 may not need any parameters. In one implementation, a white space may be used between multiple parameters. The "payload" field 508 stores the data for the command and can be optional too, as some commands may be self-explanatory and not need a data payload.

Returning back to FIG. 4, the remote control protocol engine 408 defines only a framework to transmit control commands and their responses. Specific commands—including their optional parameters and optional payload—are defined by applications in the applications adapter 410. The remote control protocol is fully extensible by means of the extensible command set 416, so that each application has its own command set built of the extensible commands.

The security engine 412 plays an important role in the remote interaction engine 106. It is important and sometimes even critical that a home or office computer 104 be controlled only by trusted mobile phones 102. A mobile phone 102 must be authenticated by the computer 104 which it is trying to control. In one implementation, the security concerns are addressed throughout the functioning of the remote interaction engine 106, to ensure that the control procedures are performed in a secure manner.

In an implementation in which the overlay network 202 is an IM service, the remote interaction engines 106 and 106' are IM clients and interact directly only with the passport server, notification server, and switchboard server of the IM service. Therefore, in one implementation, the security engine 412 trusts only packets from this IM service, and packets from other ports and addresses are treated as insecure data and dropped. In addition, the security engine 412 does not listen on other ports or accept any incoming connection.

Second, in an IM implementation, the buddy manager 432 may not allow a computer 104 to accept packets from mobile phones 102 that are not in an IM buddy list. Thus, in some implementations, an explicit IM buddy establishing procedure must be performed before a mobile phone 102 is able to control a computer 104.

Lastly, after the buddy establishing procedure, the encryption key manager 434 may prompt the mobile phone 102 and computer 104 to immediately exchange their public keys before further communication. After that, all packets for the remote control session are encrypted by the sender using the receiver's public key and decrypted with the receiver's private key at the receiver. Packets received before exchanging public keys are treated as illegal and are dropped.

Figure 6:
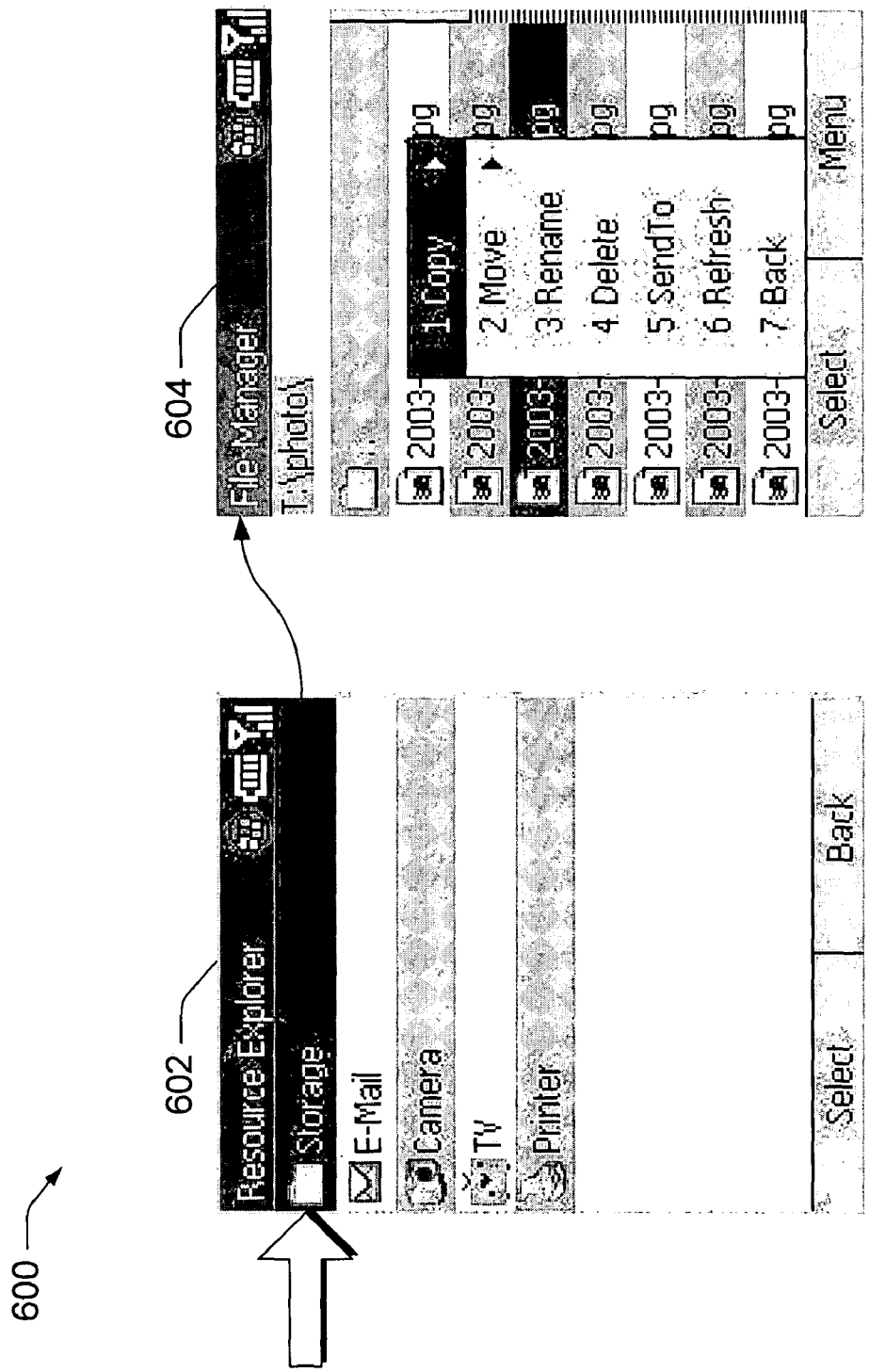
FIG. 6 is a screenshot of an exemplary user interface of a file manager application usable to remotely control file operations on the computer.

The applications adapter 410 allows multiple applications to work through the remote control protocol engine 408. For example, the file manager 420 is one such application that provides an explorer-like user interface as shown in FIG. 6 that is designed to fit on the display screen of the mobile phone 102. In one implementation of the user interface, a "resource explorer" main menu 602 on the mobile phone 102 may display the various application options available for remote control on the computer 104, such as storage/file maintenance, email, camera control, TV recording, document printing, etc. If the storage/file maintenance option is selected from the main menu 602, then the file manager menu 604 opens, from which the user can browse, copy, rename, move and delete files in the home or office computer 104.

Other applications besides the file manager 420 can be included in the remote interaction engine 106, as shown in FIG. 4. An email manager 422 can allow the mobile phone user to remotely send emails from the home or office computer 104 and optionally attaches a remotely stored file onto the e-mail. Likewise, the remote TV recording manager 424, the remote camera monitoring manager 426, and the remote document printing manager 428, allow the mobile phone user to have the remote computer 104 perform remote TV monitoring, remote camera monitoring, and remote printing.

Using the file manager 420 as an example application, formats of example commands used by the file manager 420 are shown in Table (1). The sending and receiving of these commands are from the perspective of the mobile phone 102. Italic text signifies that the command is sent by the mobile phone 102 (client) and the normal text signifies that the response is received by the mobile phone 102 (i.e., sent by the computer 104).

TABLE (1)

1) DRV is used to obtain a list of drives in the remote computer. The computer replies with a DRIVELIST response.
   DRV <TransactionId>
   DRIVELIST <TransactionId> <TotalNumber>
   A:\
   C:\
   D:\
   E:\
2) DIR is used to obtain a list of files in a given directory. The computer replies with a FILELIST response.
   DIR <TransactionId> <StartNumber> C:\
   FILELIST <TransactionId> <StartNumber> <TotalNumber>
   Directory1\
   Directory2\
   File1
   File2
   ...
3) CPY is used to copy files between two directories in the remote computer. The computer replies with an OK command on success or ERROR command on failure.
   CPY <TransactionId> C:\SourceFile.TXT D:\DestinationDirectory\
   OK 0
4) REN is used to rename a file or a directory in the remote computer. The computer replies with an OK command on success or ERROR command on failure.
   REN <TransactionId> C:\OldFileName.TXT C:\NewFileName.TXT
   OK 0
5) MOV is used to move files between two directories in the remote computer. The computer replies with an OK command on success or ERROR command on failure.
   MOV <TransactionId> C:\SourceFile.TXT D:\DestinationDirectory\
   OK 0
6) DEL is used to delete files in the remote computer. The computer replies with an OK command on success or ERROR command on failure.
   DEL <TransactionId> C:\FileToBeDeleted.TXT
   OK 0

In case there are too many files in a directory that cannot be returned in a single response, the computer 104 can return a partial list of files and set "StartNumber" and "TotalNumber" parameters. The mobile phone 102 can then use the two values of the StartNumber and TotalNumber parameters to retrieve remaining files using a subsequent command.

Exemplary Methods

Figure 7:
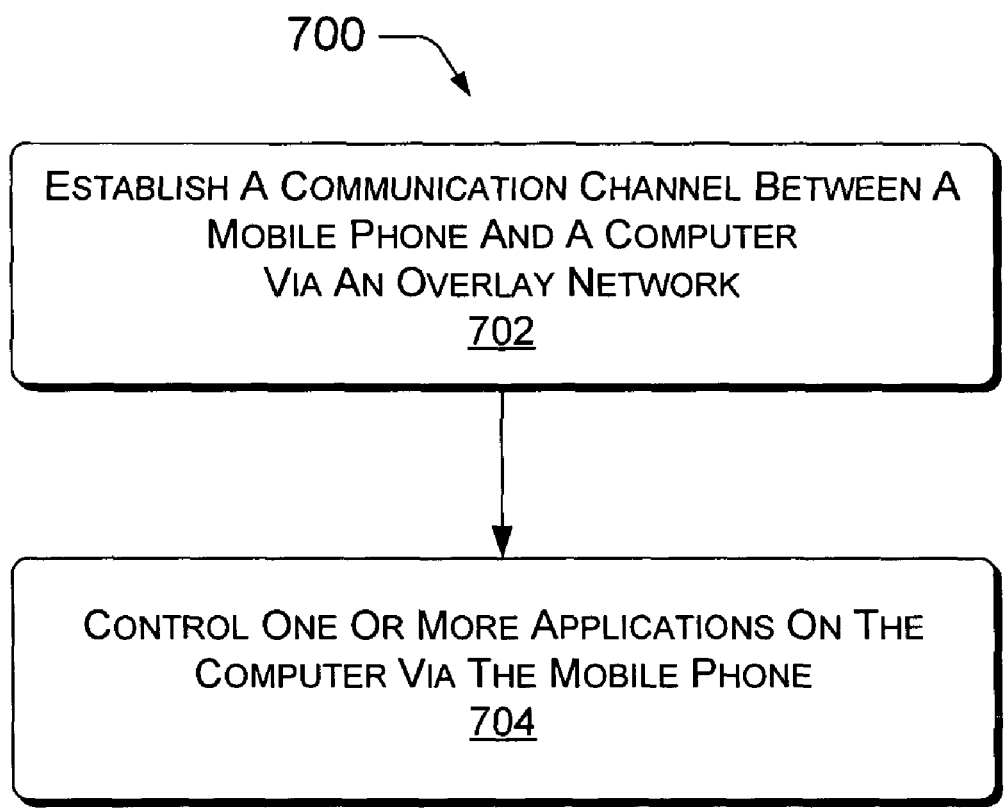
FIG. 7 is a flow diagram of an exemplary method of using a mobile phone to remotely control a computing device via an overlay network.

FIG. 7 shows an exemplary method 700 for using a mobile phone to remotely control a computing device. In the flow diagram, the operations are summarized in individual blocks. Parts of the exemplary method 700 may be performed by hardware, software, firmware, etc., or combinations thereof, for example, by components of the exemplary remote interaction engine 106.

At block 702, a communication channel is established between a mobile phone and a computer via an overlay network, such as an instant messaging service. Establishing the communication channel can include adopting a layered remote interaction architecture ("stack") that includes various stack layers, beginning with a low level physical transport layer. Using this low level physical transport layer may include establishing a GPRS or a CDMA1x link between the mobile phone and the Internet. Likewise, in a computer-side version of the architecture, using the low level physical transport layer may include establishing an ADSL or a corporate intranet link between the computer and the Internet.

Providing a communication channel includes adopting an overlay protocol, such as an IM protocol, that uses the low level physical transport layer. An overlay protocol-based transport protocol layer on top of the overlay protocol provides a stream-oriented interface to upper layers. Defining a set of extensible commands and a packet framework for exchanging data between the mobile phone and the computer is done at the next upper layer—the remote control protocol layer. Establishing an applications layer allows multiple application management modules to each have commands built on the extensible command set of the layer below, customized for each particular application to be controlled on the remote computer.

A security layer interfaces with the other layers of the architecture, ensuring secured communication by using, for example, IM accounts, a buddy list that excludes data packets from non-participants, and paired-key encryption.

At block 704, one or more applications on the computer are controlled via the mobile phone. The applications may include, for example, a file management application, an email application, a multimedia recording application, a camera monitoring application, a document printing application, etc.

A user interface tailored for the mobile phone may offer a root menu of applications on the computer available for remote control. When an application is selected, one or more submenus offer the various commands and actions appropriate for the selected application.

When a command is selected from a submenu, the above-described layers of the remote interaction architecture convert the user friendly version of the command from the mobile phone's user interface into data packets transportable by the overlay protocol layer and the lower level physical transport layer to the computer, where the commands are executed. For example, the user may select an option that commands the remote computer to attach a document to an email, and then send the email and document from the remote computer. The computer sends back responses to the mobile phone via an architecture similar to that of the phone, informing the mobile phone of a received command or an executed action.

CONCLUSION

The subject matter described above can be implemented in hardware, software, firmware, etc., or combination thereof. In certain implementations, the subject matter may be described in the general context of computer-executable instructions, such as program modules, being executed by a computing device or communications device. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The foregoing discussion describes using a mobile phone to remotely control a computer via an overlay network. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
   establishing a communication channel between a mobile phone and a computer via an instant messaging (IM) service;
   creating a first account associated with the mobile phone and a second account associated with the computer, the first and second accounts associated with the IM service;
   establishing a buddy list associated with the second account, wherein the first account is a member of the buddy list; and
   after establishing the buddy list, initiating a control session between the mobile phone and the computer such that the mobile phone controls multiple applications on the computer using data packets sent via the IM service, wherein each data packet has at least a command field and a transaction identifier field, the command field to include a command for controlling one application of the multiple applications on the computer, and the transaction identifier field to match responses from the computer with commands sent from the mobile phone, the mobile phone having a first user interface differing from a second user interface of the computer.

2. The method as recited in claim 1, wherein establishing the communication channel includes establishing a transport protocol that uses the IM service for exchanging data between the mobile phone and the computer.

3. The method as recited in claim 2, wherein establishing the communication channel includes establishing the transport protocol to include Winsock-like application programming interfaces (APIs).

4. The method as recited in claim 2, wherein establishing the communication channel includes establishing the transport protocol, wherein the transport protocol applies public-private key pairs to ensure a secured communication.

5. The method as recited in claim 1, wherein establishing the communication channel includes establishing a control protocol that interfaces with a transport protocol established to use the IM service for exchanging data between the mobile phone and the computer, wherein the control protocol specifies a packet format for exchanging extensible commands between the mobile phone and the computer.

6. The method as recited in claim 5, further comprising establishing application managers, each application manager to send application-specific commands from the mobile phone via the control protocol.

7. The method as recited in claim 1, wherein establishing the communication channel between the mobile phone and the computer includes providing for logging on to respective accounts of the IM service for each of the mobile phone and the computer.

8. The method as recited in claim 1, wherein data from a mobile phone account that is not on the buddy list is disregarded.

9. The method as recited in claim 1, further comprising securing communications on the communication channel by encrypting data exchanged between the mobile phone and the computer.

10. The method as recited in claim 1, wherein the multiple applications on the computer to be controlled by the mobile phone include at least one of a file managing application, an email application, a multimedia recording application, a camera monitoring application, or a document printing application.

11. The method as recited in claim 1, wherein establishing the communication channel includes establishing a physical communication link between the mobile phone and the overlay network using a first communications protocol and establishing a physical communication link between the computer and the overlay network using a second communications protocol.

12. The method as recited in claim 4, wherein the data packets that are exchanged between the mobile phone and the computer before applying the public-private key pairs are dropped.

13. The method as recited in claim 1, wherein controlling further includes the mobile phone transmitting text-based commands to the computer.

14. The method as recited in claim 1, wherein initiating the control session further comprises the mobile phone initiating the control session while the computer is in a wait mode.

15. The method as recited in claim 1, wherein the first account is unique to the mobile phone and the second account is unique to the computer.

16. A system, comprising:
a mobile phone that is communicatively coupled with the Internet, the mobile phone having a first user interface;
a computer that is communicatively coupled with the Internet, comprising a processor and a memory accessed by and operated on by the processor, the computer having a second user interface differing from the first interface of the mobile phone; and
remote interaction engines in the mobile phone and the computer, wherein each remote interaction engine possesses a layered architecture for enabling the mobile phone to control applications on the computer via an instant messaging (IM) service communicatively coupled with the Internet, the layered architecture including a transport protocol layer that is based on the IM service and that allows connectivity between the mobile phone and the computer even when network address translation (NAT) and a firewall are present, the remote interaction engines further comprising:
a security engine that trusts only packets from the IM service and drops packets received from other ports and addresses.

17. The system as recited in claim 16, wherein the layered architecture includes a physical connection layer, an overlay protocol layer, a transport protocol layer, a control protocol layer, and an applications layer.

18. The system as recited in claim 16, wherein the remote interaction engine includes a communications stack, including a physical transport manager, an overlay protocol engine, a transport protocol engine, a remote control protocol engine, and an applications adapter.

19. The system as recited in claim 18, wherein the remote control protocol engine includes a set of extensible commands and a packet formatter.

20. The system as recited in claim 16, wherein the mobile phone controls applications on the computer using data packets sent via the IM service, wherein each data packet has at least a command field and a transaction identifier field, the command field to include a command for controlling one of the applications on the computer, and the transaction identifier field to match responses from the computer with commands sent from the mobile phone.

* * * * *